United States Patent
Gonzalez et al.

(10) Patent No.: US 7,599,388 B2
(45) Date of Patent: Oct. 6, 2009

(54) SYSTEM AND METHOD FOR HIGH-BANDWIDTH SERIAL BUS DATA TRANSFER

(75) Inventors: Matthew Gonzalez, Carpinteria, CA (US); William M. Street, Bend, OR (US)

(73) Assignee: Echo Digital Audio Corporation, Carpinteria, CA (US)

( * ) Notice: Subject to any disclaimer, the term of this patent is extended or adjusted under 35 U.S.C. 154(b) by 578 days.

(21) Appl. No.: 11/392,971

(22) Filed: Mar. 28, 2006

(65) Prior Publication Data

US 2006/0221997 A1    Oct. 5, 2006

Related U.S. Application Data

(60) Provisional application No. 60/666,377, filed on Mar. 29, 2005.

(51) Int. Cl.
*H04L 12/66* (2006.01)
(52) U.S. Cl. ...................................... 370/463
(58) Field of Classification Search ............... 370/463, 370/431; 710/305, 100
See application file for complete search history.

(56) References Cited

U.S. PATENT DOCUMENTS 6,904,475 B1 *  6/2005  Fairman ...................... 710/52

2003/0195645 A1 * 10/2003  Pillay et al. ................... 700/94

OTHER PUBLICATIONS

"TSB43CA43A/TSB43CB43A/TSB43CA42 iceLynx-Micro IEEE 1394a-2000 Consumer Electronics Solution Abbreviated Data Manual", SLLS546H, Dec. 2005, pp. 1-97.

* cited by examiner

*Primary Examiner*—Kwang B Yao
*Assistant Examiner*—Tung Q Tran
(74) *Attorney, Agent, or Firm*—Koppel, Patrick, Heybl & Dawson

(57) ABSTRACT

A serial bus data transfer system employs an interface circuit which includes a first FIFO which receives data from a serial bus and a second FIFO which outputs data to the bus. A first processor interfaces with the FIFOs and a dual-banked shared memory comprising first and second memory banks, such that data is routed between the FIFOs and the memory banks via the first processor. A second processor interfaces with the dual-banked shared memory such that data can be bidirectionally exchanged between either memory bank and the second processor. The first memory bank can be accessed and clocked by the first processor while the second memory bank is simultaneously accessed and clocked by the second processor, and vice versa, such that data can be simultaneously transferred between the FIFOs and the second processor via the dual-banked shared memory.

27 Claims, 4 Drawing Sheets

SYSTEM AND METHOD FOR HIGH-BANDWIDTH SERIAL BUS DATA TRANSFER

RELATED APPLICATIONS

This application claims the benefit of provisional patent application No. 60/666,377 to Gonzalez et al., filed Mar. 29, 2005.

BACKGROUND OF THE INVENTION

1. Field of the Invention

This invention relates to serial bus data transfer methods, and particularly to the transfer of isochronous data via an IEEE-1394 serial bus interface.

2. Description of the Related Art

Serial data busses are used in many applications. One use for such a bus is to convey digitized data from one device to another. For example, an analog audio signal might be digitized using an analog-to-digital converter (ADC) and then conveyed to a destination device via a serial data bus. Similarly, digitized audio data might be conveyed via a serial data bus and converted to one or more analog signals using respective digital-to-analog converters (DACs).

Some sort of interface circuit is typically required in such applications, interposed between the serial bus and the external devices providing or receiving the bus data, to process and format the data as needed by the external devices. One popular serial bus is compliant with the IEEE-1394 standard; products supporting this standard commonly use the trademarked name "FireWire".

One typical application of an interface circuit which complies with IEEE-1394 is shown in FIG. 1. Here, the interface circuit is contained within an integrated circuit (IC) 10 known as an iceLynx-Micro® IC from Texas Instruments Incorporated. This IC includes first and second first-in/first-out (FIFO) memory devices (12, 14); FIFO 12 receives serial data from an IEEE-1394 bus 16, and FIFO 14 outputs data to the bus. IC 10 also includes an embedded processor 18 known as the ARM7DTMI® ("ARM") which controls the timing of the IC, and a dual-banked shared memory 20, the use of which is application dependent.

In the example shown, serial bus 16 is used to convey digitized audio data. Data received from bus 16 is processed through FIFO 12 and provided to a DAC 22 via a serial bus such as an I2S bus 24; DAC 22 converts the digitized signal to one or more analog audio signals 26. Similarly, incoming analog audio signals 28 are digitized with an ADC 30, and conveyed back to bus 16 via an I2S bus 32 and FIFO 14.

However, there is a limit to the amount of data which can be conveyed by the system shown in FIG. 1. Because the iceLynx-Micro® IC was designed to handle either video or 5.1 channel audio data, the application shown in FIG. 1 can accommodate a maximum of six channels of audio data which has been sampled at a 192 kHz sampling rate. Unfortunately, for some applications, this data throughput limitation may be unacceptable.

SUMMARY OF THE INVENTION

A system and method for high-bandwidth serial bus data transfer is presented which overcomes the problem noted above, in that large amounts of digital data can be conveyed—e.g., up to 12 incoming and outgoing channels of 192 kHz audio data can be carried in one embodiment—while still being fully compliant with IEEE-1394 standards.

The present serial bus data transfer system employs a serial bus interface circuit which includes first and second memory devices arranged to interface with a serial bus such that the first memory device receives data from the bus and the second memory device outputs data to the bus. The circuit includes a dual-banked shared memory comprising first and second memory banks, and a first processor which interfaces with the first and second memory devices and the first and second memory banks such that data is routed between the memory devices and the memory banks via the first processor. A second processor, typically external to the interface circuit, is arranged to interface with the dual-banked shared memory such that data can be bidirectionally exchanged between either memory bank and the second processor.

The system is arranged such that the first memory bank can be accessed and clocked by the first processor while the second memory bank is simultaneously accessed and clocked by the second processor, and vice versa, such that data can be simultaneously transferred from the memory devices to the second processor and from the second processor to the memory devices via the dual-banked shared memory. By simultaneous use of each half of the dual-banked shared memory, large amounts of data may be transferred.

The present system interfaces with a serial bus such as an IEEE-1394 bus. The system's serial bus interface circuit is suitably the iceLynx-Micro® IC from Texas Instruments Incorporated, modified as described herein. Data is preferably exchanged between the second processor and the dual-banked shared memory as de-packetized parallel data.

Further features and advantages of the invention will be apparent to those skilled in the art from the following detailed description, taken together with the accompanying drawings.

DETAILED DESCRIPTION OF THE INVENTION

The present invention is directed to a system and method for transferring serial bus data. The system includes a serial bus interface circuit which comprises a first processor and a dual-banked shared memory, and a second processor; the interface circuit transfers data between a serial bus and the second processor. The dual-banked shared memory can be accessed by either the first or second processors, and each half of the dual-banked memory can be clocked by either processor. By simultaneous use of each half of the dual-banked memory, large amounts of data can be transferred.

Though useful with various serial bus types and serial data formats, the present system is suitably used for conveying high-bandwidth media data sent isochronously on a high speed serial bus such as FireWire (IEEE-1394) between the bus and downstream devices such as ADCs and DACs. The system enables large amounts of digital data to be conveyed—for example, in one embodiment, up to 12 incoming and outgoing channels of 192 kHz audio data can be carried—while still being fully compliant with IEEE-1394 standards.

Figure 1:
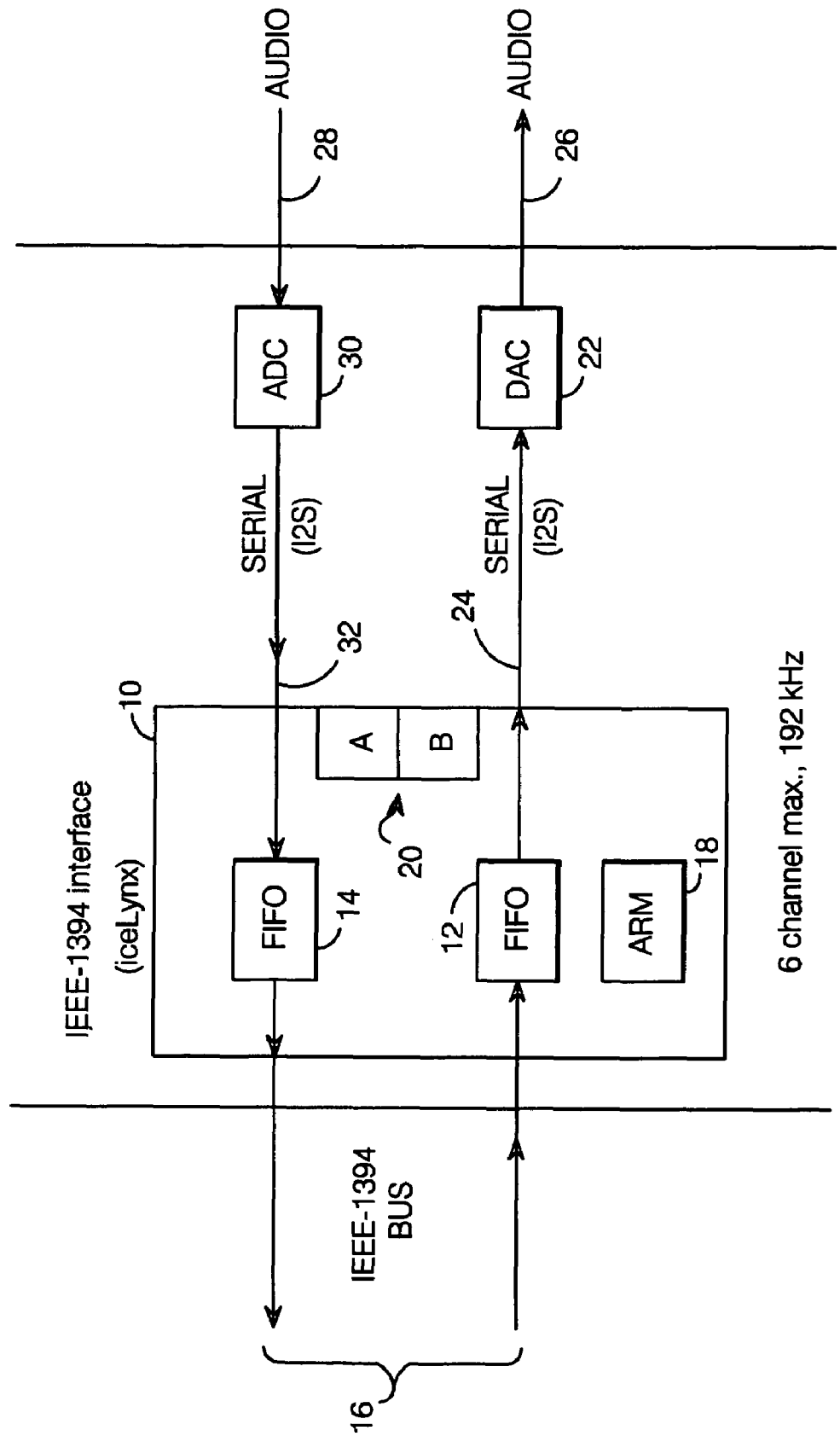
FIG. 1 is a block diagram of a known serial bus interface application.
Figure 2:
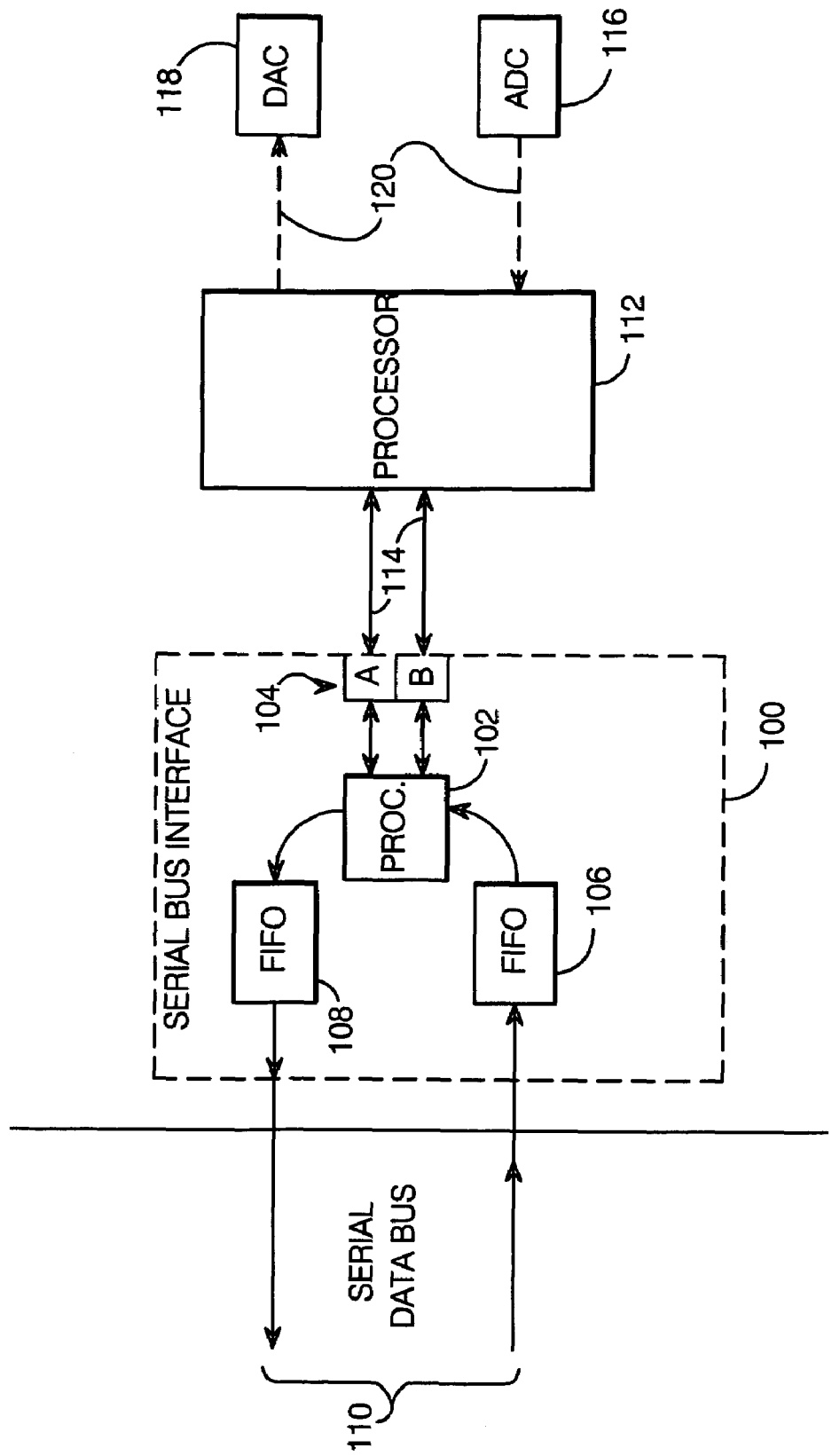
FIG. 2 is a block diagram of a serial bus data transfer system per the present invention.

A block diagram of a serial bus data transfer system per the present invention is shown in FIG. 2. As noted above, a serial bus interface circuit 100 comprises a processor 102 and a dual-banked shared memory 104; the two memory banks are identified as 'A' and 'B'. Serial bus interface circuit 100 also includes first and second memory devices 106, 108, suitably FIFOs, which are arranged to interface with a serial bus 110 such that FIFO 106 receives serial data from the bus and FIFO 108 outputs serial data to the bus. Processor 102 is arranged to interface with FIFOs 106 and 108 and with memory banks A and B, such that data is routed between the FIFOs and the memory banks via processor 102.

Serial bus interface circuit 100 is typically contained with an IC, with the second processor (112)—typically a digital signal processor (DSP)—being external to the IC. Processor 112 is arranged to interface with dual-banked shared memory 104 such that data 114 can be bidirectionally exchanged between either memory bank and the processor. The system is arranged such that either processor 102 or processor 112 can be in complete control of each memory bank. When a given processor is in control of a given memory bank, it can both read and write that bank independent of what the other processor is doing. Each memory bank is clocked by the processor with which it is communicating, with the clock source switchable between the two processors. For example, memory bank A can be accessed and clocked by processor 102 while memory bank B is simultaneously accessed and clocked by processor 112, and memory bank B can be accessed and clocked by processor 102 while memory bank A is simultaneously accessed and clocked by processor 112. In this way, data can be simultaneously transferred from the FIFOs to processor 112 and from processor 112 to the FIFOs via dual-banked shared memory 104.

Data 114 is preferably conveyed between dual-banked shared memory 104 and processor 112 as parallel data, with de-packetized parallel data preferred. When arranged as described herein, the present system is suitably used for transferring high-bandwidth media data—such as 192 kHz-sampled PCM audio data or audio data per IEC60958 or SACD standards—sent isochronously on a high speed serial bus such as FireWire between the bus and a processor.

In a preferred embodiment, serial bus interface circuit 100 comprises an iceLynx-Micro® IC from Texas Instruments Incorporated, with processor 102 being an ARM7DTMI® microprocessor embedded in the iceLynx-Micro® IC. The IC is configured such that FIFO 106 receives serial data from bus 110 and outputs it to processor 102, and FIFO 108 receives serial data from processor 102 and outputs it to bus 110. Processor 102 also interfaces with dual-banked shared memory 104. Data is directly manipulated by processor 102, the operation of which is directed by software, typically in the form of firmware (not shown). In the iceLynx-Micro® implementation shown, the direct manipulation of data is accomplished using custom firmware which directs processor 102 to transfer data between the FIFOs and the A and B memory banks as needed to effect a desired data transfer. The iceLynx-Micro® firmware must be modified to accommodate this arrangement. By so doing, the interface circuit is made capable of handling any sort of isochronous data.

As noted above, processor 112 can be, for example, a DSP, such as the TI TMS320C6713, in which appropriate firmware has been embedded. Data is preferably exchanged in parallel between processor 112 and dual-banked shared memory 104. Processor 112 can then be arranged to communicate serially with downstream devices such as an ADC 116 and/or a DAC 118, using, for example, I2S serial bus lines 120.

By enabling the first processor to have access to the FIFOs and to the dual-banked shared memory as described herein, the throughput capacity of the system is significantly increased. A system so arranged can accommodate up to 12 incoming and outgoing channels of 192 kHz audio data—while still being fully compliant with IEEE-1394 standards. As audio standards requiring more than six channels are becoming commonplace in the home entertainment market, this increased capacity can be very beneficial or essential.

Figure 3:
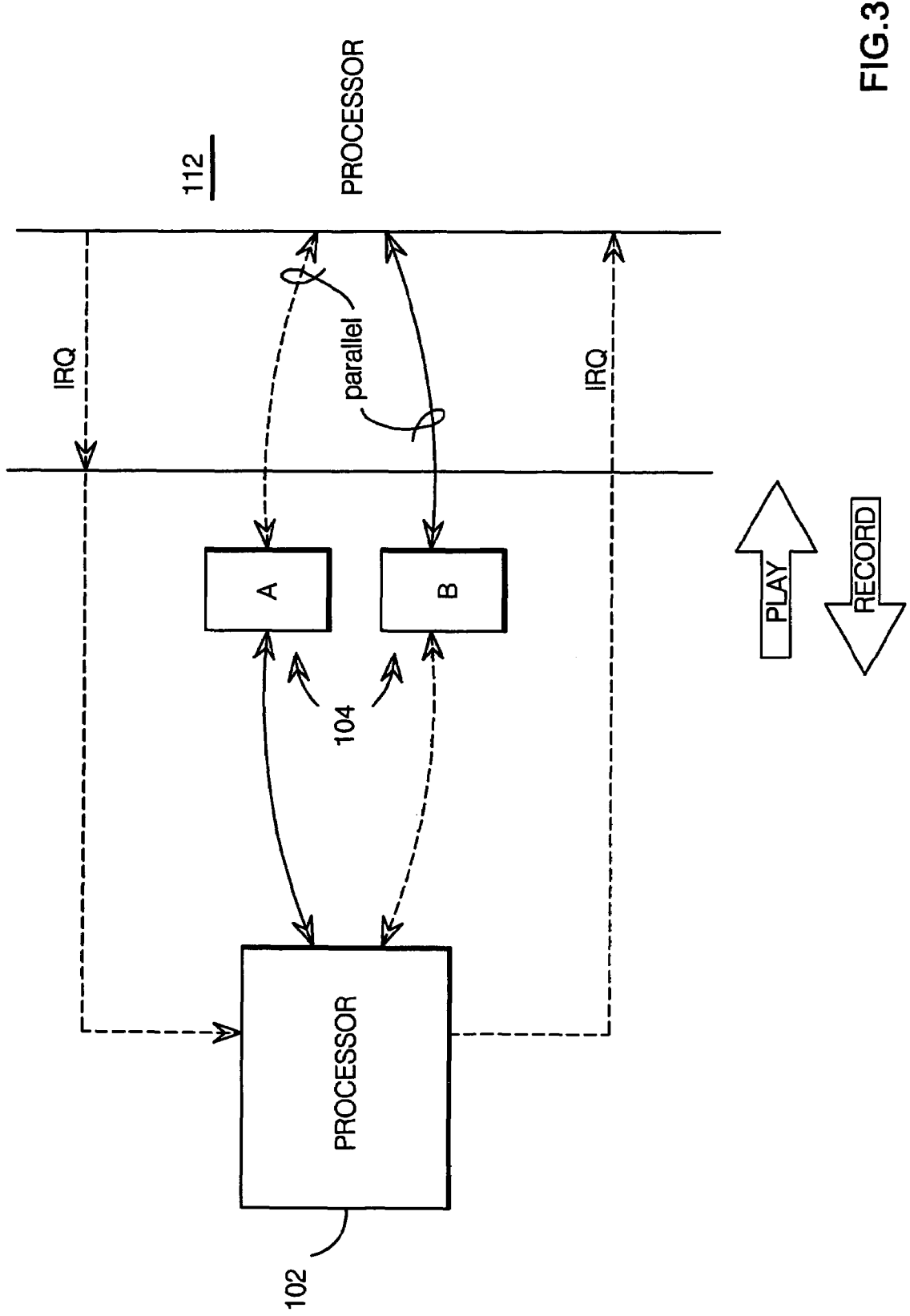
FIG. 3 is a block diagram illustrating the transfer of data between a serial bus interface circuit and an external processor per the present invention.

FIG. 3 illustrates the interaction between processor 102, processor 112 and dual-banked shared memory 104. As noted above, each bank can be accessed, clocked and controlled by either processor, independent of what the other processor is doing, with the connections between the processors and the dual-banked shared memory being switchable. A typical sequence of events might proceed as follows:

processor 102 reads bank A while processor 112 reads bank B;

processor 102 writes bank A while processor 112 writes bank B;

bank switch: processor 102 assumes control of bank B, processor 112 controls bank A;

processor 102 reads bank B while processor 112 reads bank A;

processor 102 writes bank B while processor 112 writes bank A;

bank switch: processor 102 again controls bank A, processor 112 controls bank B;

and so forth.

As illustrated in FIG. 3, data is exchanged in parallel between dual-banked shared memory 104 and second processor 112. When data is provided serially to downstream devices, processor 112 operates as a parallel-to-serial converter. To provide this functionality, along with additional processing such as decoding, delay, reverb, or equalization, processor 112 will typically need to be much faster and more powerful than processor 102.

Each processor is preferably connected to the other by means of at least one interrupt line (IRQ), which each processor uses to inform the other that it has completed its current reading or writing task and is "ready" to perform the next task.

This arrangement might be used, for example, to interface an audio device having an analog input and output to a computer having a FireWire interface. Using an interface circuit and DSP as described herein, digital audio data stored in the computer can be transferred to the audio device ("play"), and analog audio to be stored digitally can be transferred to the computer ("record").

Figure 4:
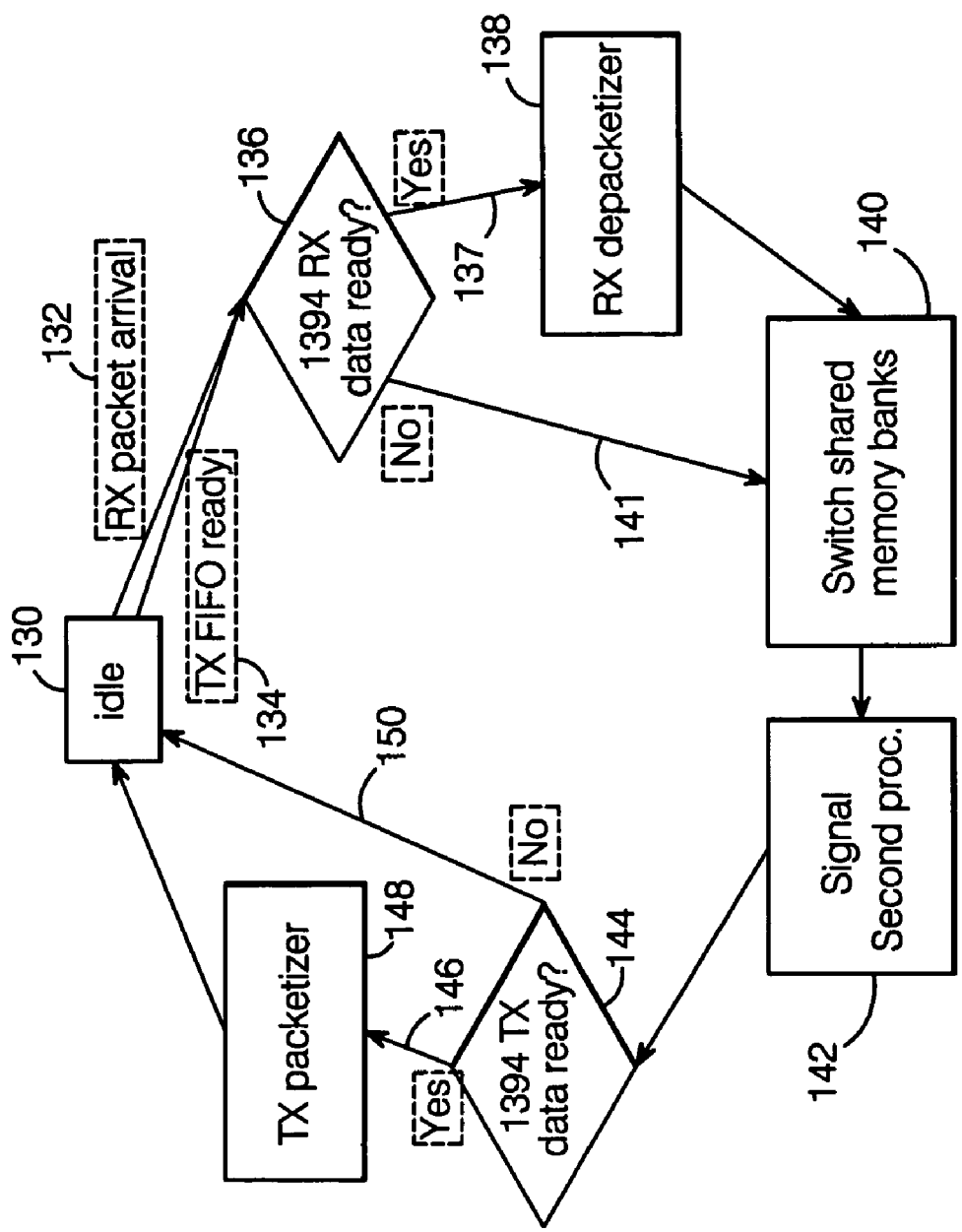
FIG. 4 depicts a flow chart which illustrates one possible instruction sequence that might be executed by a serial bus interface circuit's processor in accordance with the present invention.

The software required to operate the first processor is developed by conventional means known to those familiar with such processors. FIG. 4 depicts a flow chart which illustrates one possible operating sequence that might be executed by the system when interfaced to an IEEE-1394 bus. First processor 102 is concerned with handling packets received from other 1394 devices (RX) and packets being transmitted to other 1394 devices (TX). Data contained in 1394 RX packets is placed in dual-banked shared memory 104 for use by processor 112. Data placed in the shared memory by processor 112 is used by processor 102 to create 1394 TX packets.

Processor 102 begins in an idle state (130), waiting for an interrupt. Shared memory 104 is configured such that one bank is controlled by processor 102 and the other bank is controlled by processor 112.

Either a RX packet arrives (132) in 1394 receive FIFO 106 from another device, or 1394 transmit FIFO 108 signals that it is ready (134) for a packet. Either event causes an interrupt to processor 102, which triggers the first state transition on the flow chart.

Processor 102 checks the amount of data in the receive FIFO (136); if there is enough data (137), it runs the receive depacketizer (138), which takes the data from the receive FIFO and copies it to the shared memory bank that is controlled by processor 102. Processor 102 then switches the memory banks (140) so that both banks change modes—the bank that was previously being controlled by processor 102 is switched to the control of processor 112 and vice versa. If processor 102 checks the amount of data in the receive FIFO and determines that there is not enough data (141), processor 102 switches the memory banks so that both banks change modes (140). Processor 102 then signals processor 112 that a bank switch has occurred (142).

Processor 102 then looks at the shared memory bank that was just switched from processor 112 to processor 102 (144). If the shared memory bank contains data to be packetized for transmission (146), processor 102 runs the packetizer (148). The packetizer takes the data from the shared memory and converts it to 1394 packets, placing the packets in the 1394 transmit FIFO. Processor 102 then returns to the idle state (130), again waiting for an interrupt. If the shared memory bank does not contain data to be packetized (150), processor 102 returns to the idle state (130).

Note that it is not essential that the system employ an iceLynx-Micro® interface chip. Other IEEE-1394 controller chips might also be used; the necessary functionality might also be provided discretely.

As noted above, second processor 112 may be a DSP, though other types of devices might also be used. For example, a logic device such as a field programmable gate array (FPGA) or an ASIC device could be connected as an interface between the dual-banked shared memory and downstream devices, with the device logic programmed as needed to handle the required data transfers. For instance, an FPGA could be programmed such that it periodically transfers data to and from one of the memory banks, transfers it downstream, then switches to the other memory bank and does the same, signaling the first processor when ready to transfer additional data. Operation of the logic device could be directed by the first processor, with the necessary command information conveyed to the logic device either via the dual-banked shared memory or with dedicated command lines (not shown).

Also note that, in addition to being capable of conveying high-bandwidth media data sent isochronously on a high speed serial bus between the bus and downstream devices, the present system can also be arranged to convey asynchronous data, as well as command data originating from either the serial bus or the first processor.

While particular embodiments of the invention have been shown and described, numerous variations and alternate embodiments will occur to those skilled in the art. Accordingly, it is intended that the invention be limited only in terms of the appended claims.

We claim:

1. A serial bus data transfer system, comprising:
   a serial bus interface circuit which comprises:
      first and second memory devices arranged to interface with a serial bus such that said first memory device receives serial data from said bus and said second memory device outputs serial data to said bus;
      a dual-banked shared memory comprising first and second memory banks; and
      a first processor arranged to interface with said first and second memory devices and said first and second memory banks such that said serial data is routed between said memory devices and said memory banks via said first processor; and
   a second processor arranged to interface with said dual-banked shared memory such that data can be bidirectionally exchanged between either memory bank and said second processor;
   said system arranged such that said first memory bank can be accessed and clocked by said first processor while said second memory bank is simultaneously accessed and clocked by said second processor, and such that said second memory bank can be accessed and clocked by said first processor while said first memory bank is simultaneously accessed and clocked by said second processor, such that data can be simultaneously transferred from said memory devices to said second processor and from said second processor to said memory devices via said dual-banked shared memory.

2. The system of claim 1, wherein said serial bus operates in compliance with IEEE-1394.

3. The system of claim 1, wherein said second processor is a digital signal processor (DSP).

4. The system of claim 1, wherein said system is arranged such that data is exchanged between said memory banks and said second processor as parallel data.

5. The system of claim 4, wherein said parallel data is de-packetized parallel data.

6. The system of claim 1, wherein said system is arranged such that said data conveyed between said serial bus interface circuit and said serial bus is isochronous data.

7. The system of claim 1, wherein said system is arranged such that said data conveyed between said serial bus interface circuit and said serial bus is high bandwidth media data.

8. The system of claim 1, wherein said serial bus Interface circuit is housed within an integrated circuit (IC).

9. The system of claim 8, wherein said serial bus interface circuit is a modified version of the serial bus interface circuit found within an iceLynx-Micro® IC from Texas Instruments Incorporated.

10. The system of claim 9, wherein said first processor is the ARM7DTMI® microprocessor as used in an iceLynx-Micro® IC.

11. The system of claim 1, wherein said serial bus interface circuit includes firmware which directs the operation of said first processor, said firmware arranged to control said first processor as needed to effect said transfer of data between said memory devices and said dual-banked shared memory.

12. The system of claim 1, further comprising:
   one or more digital-to-analog converters (DAC) which receive digital data from said second processor and converts it to an analog output signal; and
   one or more analog-to-digital converters (ADC) which receive an analog input signal and provides digital data to said second processor.

13. The system of claim 12, wherein said digital data is conveyed between said second processor and said DACs, and between said ADCs and said second processor, via respective I2S serial bus lines.

14. The system of claim 1, wherein said system is arranged such that each of said processors perform reading and writing tasks requiring access to said first and second memory banks, access to said first and second memory banks alternating back and forth between said first processor and said second processor, respectively, or between said second processor and said first processor, respectively, such that said first processor and said second processor simultaneously access said first and second memory banks, respectively, until both said first processor and said second processor complete respective tasks, after which said first processor and said second processor simultaneously access said second and first memory banks, respectively, until both said first processor and said second processor complete respective tasks.

15. The system of claim 14, wherein said system is arranged such that said first processor switches from one memory bank to the other upon receipt of a control signal indicating that said second processor has completed its task, and said second processor switches from one memory bank to the other upon receipt of a control signal indicating that said first processor has completed its task.

16. The system of claim 1, wherein said first and second memory devices are respective first-in/first-out (FIFO) memory devices.

17. The system of claim 1, wherein said second processor is a logic device.

18. The system of claim 17, wherein said system is arranged such that said logic device operates in response to commands received from said first processor.

19. The system of claim 18, wherein said commands are received from said first processor via said dual-banked shared memory.

20. The system of claim 18, wherein said commands are received from said first processor via dedicated control lines.

21. The system of claim 17, wherein said logic device is a field programmable gate array (FGPA).

22. The system of claim 17, wherein said logic device is an application-specific integrated circuit (ASIC).

23. The system of claim 1, wherein said system is arranged to transfer isochronous, asynchronous and/or command data between said second processor and said serial bus.

24. An IEEE-1394 serial bus data transfer system, comprising:
- a serial bus interface circuit integrated circuit (IC) which comprises:
  - first and second first-in/first-out (FIFO) memory devices, said first and second FIFOs arranged to interface with a serial bus which operates in compliance with IEEE-1394, such that said first FIFO receives serial data from said bus and said second FIFO outputs serial data to said bus;
  - a dual-banked shared memory comprising first and second memory banks;
  - a first processor arranged to interface with said first and second FIFOs and said first and second memory banks such that said serial data is routed between said FIFOs and said memory banks via said first processor; and
  - firmware arranged to direct the operation of said first processor; and
- a second processor external to said serial bus interface circuit IC arranged to interface with said dual-banked shared memory such that parallel data can be bidirectionally exchanged between either memory bank and said second processor;
- said system arranged such that said first memory bank can be accessed and clocked by said first processor while said second memory bank is simultaneously accessed and clocked by said second processor, and such that said second memory bank can be accessed and clocked by said first processor while said first memory bank is simultaneously accessed and clocked by said second processor, such that data can be simultaneously transferred from said FIFOs to said second processor and from said second processor to said FIFOs via said dual-banked shared memory.

25. The system of claim 24, wherein said system is arranged such that each of said processors perform reading and writing tasks requiring access to said first and second memory banks, said first processor and second processor arranged to provide respective control signals to each other indicating when each has completed a task, said system further arranged such that said first processor switches from one memory bank to the other upon receipt of said control signal from said second processor and said second processor switches from one memory bank to the other upon receipt of said control signal from said first processor.

26. A method of transferring serial bus data between a serial bus and a processor, comprising:
- providing first and second memory devices arranged to interface with a serial bus such that said first memory device receives serial data from said bus and said second memory device outputs serial data to said bus;
- providing a dual-banked shared memory comprising first and second memory banks;
- providing a first processor interfaced with said first and second memory devices and said first and second memory banks such that data is routed between said memory devices and said memory banks via said first processor;
- providing a second processor interfaced with said dual-banked shared memory such that data can be bidirectionally exchanged between either memory bank and said second processor; and
- programming said first processor and said second processor such that said first memory bank can be accessed and clocked by said first processor while said second memory bank is simultaneously accessed and clocked by said second processor, and such that said second memory bank can be accessed and clocked by said first processor while said first memory bank is simultaneously accessed and clocked by said second processor, such that data can be simultaneously transferred from said memory devices to said second processor and from said second processor to said memory devices via said dual-banked shared memory.

27. The method of claim 26, wherein said programming comprises programming said first processor and said second processor such that:
- said first processor reads data from said first memory bank while said second processor reads data from said second memory bank;
- said first processor writes data to said first memory bank while said second processor reads writes data to said second memory bank;
- said first processor assumes control of said second memory bank and said second processor assumes control of said first memory bank;
- said first processor reads data from said second memory bank while said second processor reads data from said first memory bank;
- said first processor writes data to said second memory bank while said second processor reads writes data to said first memory bank;
- said first processor assumes control of said first memory bank and said second processor assumes control of said second memory bank; and
- said sequence repeats.

* * * * *